(12) United States Patent  (10) Patent No.: US 12,081,676 B2
Switchyarn et al.  (45) Date of Patent: Sep. 3, 2024

(54) METHOD FOR SIGNING AND SUBMITTING ELECTRONIC DOCUMENTS THROUGH VISUAL INDICIA

(71) Applicant: Finema Company Limited, Bangkok (TH)

(72) Inventors: Sammotic Switchyarn, Bangkok (TH); Nuttawut Kongsuwan, Bangkok (TH); Sarawuth Rungcharoenkit, Samut Prakan (TH); Pakorn Leesakul, Bangkok (TH)

(73) Assignee: Finema Company Limited, Bangkok (TH)

( * ) Notice: Subject to any disclaimer, the term of this patent is extended or adjusted under 35 U.S.C. 154(b) by 0 days.

(21) Appl. No.: 17/788,748

(22) PCT Filed: Jul. 20, 2021

(86) PCT No.: PCT/TH2021/000041
§ 371 (c)(1),
(2) Date: Jun. 24, 2022

(87) PCT Pub. No.: WO2023/003523
PCT Pub. Date: Jan. 26, 2023

(65) Prior Publication Data
US 2024/0195634 A1    Jun. 13, 2024

(51) Int. Cl.
*H04L 9/32* (2006.01)
*G06F 21/31* (2013.01)
*H04L 9/30* (2006.01)

(52) U.S. Cl.
CPC ............ *H04L 9/3247* (2013.01); *G06F 21/31* (2013.01); *H04L 9/30* (2013.01)

(58) Field of Classification Search
CPC ...... H04L 63/1416; H04L 41/16; G06F 40/30
See application file for complete search history.

(56) References Cited

U.S. PATENT DOCUMENTS 6,671,805 B1 * 12/2003 Brown ................. H04L 9/3247
713/180
10,523,443 B1   12/2019 Kleinman
(Continued)

OTHER PUBLICATIONS

International Search Report of PCT/TH2021/000041.

*Primary Examiner* — Normin Abedin
(74) *Attorney, Agent, or Firm* — Minder Law Group; Willy H. Wong

(57) ABSTRACT

The present invention provides a method for signing and submitting an electronic document by performing a single action in relation to a visual indicium, reducing the number of interactions that a signer needs to carry out to create and submit a digitally signed electronic document. The invention involves four parties: a server system, an auxiliary client system, a client system, and a recipient system. The server system stores the electronic document and facilitates its creation and submission processes. The auxiliary client system obtains the electronic document from the server system and displays the electronic document along with a visual indicium. Subsequently, the client system displays a single action for the signer to perform on the indicium in order to set in motion the signing process and submit the digitally signed electronic document to the recipient system.

15 Claims, 2 Drawing Sheets

(56) References Cited

U.S. PATENT DOCUMENTS

2002/0150241 A1* 10/2002 Scheidt ................ H04L 9/3033
  713/180
2012/0086971 A1   4/2012 Bisbee et al.
2012/0308003 A1* 12/2012 Mukherjee ............ H04L 9/3247
  380/243
2017/0134167 A1   5/2017 Carter
2018/0276270 A1   9/2018 Bisbee et al.
2020/0162268 A1*  5/2020 Wentz .................. H04L 9/3239
2020/0169411 A1   5/2020 Drake et al.

* cited by examiner

METHOD FOR SIGNING AND SUBMITTING ELECTRONIC DOCUMENTS THROUGH VISUAL INDICIA

RELATED APPLICATIONS

This application claims priority to PCT Patent Application No. PCT/TH2021/000041 filed Jul. 20, 2021.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

FIELD OF THE INVENTION

The present invention relates to a scheme whereby a visual indicium becomes the touchpoint that triggers the embedding of a digital signature in an electronic document and submission of said electronic document to an intended recipient.

BACKGROUND OF THE INVENTION

Traditionally, a signature is a handwritten and often stylized depiction of a person's uniquely personal, undeniable self-identification that is used on a document as physical evidence of the signer's witness and certification of the content of the document. However, a handwritten-based signature is easily forged but difficult to verify. Documents that are physically signed can also be modified at a later time, changing the content from what was originally witnessed and certified by the signer.

These problems could be mitigated for an electronic document using a digital signature, which is a mathematical scheme for certifying and verifying the authenticity of digital messages and documents. A digital signature protocol employs asymmetric cryptography and involves three sub-protocols, including key generation, signature generation, and signature verification. The key generation protocol generates a cryptographic key pair—one private key and one public key. The signature generation protocol uses an electronic document—or a set of digital messages—as input and utilizes the private key to generate a digital signature. The signature verification protocol uses the signed electronic document and the digital signature as inputs and utilizes the public key to verify the digital signature.

Signature verification is successful only if (i) the electronic document has not been altered or modified in any way since the moment it is signed and (ii) the public key that is used to verify the digital signature belongs to the same key pair as the private key that is used to sign the digital signature. The digital signature certifies the authenticity of the electronic document and makes it tamper-proof, where any modification on the electronic document can be detected. The digital signature also provides non-repudiation, where the signer cannot successfully dispute their authorship or the validity of the electronic document, while also claiming that their private key remains secret.

To verify a digital signature, the verifier must gain a means to access the right public key. Such mean is provided by a public key infrastructure, which is a set of roles, policies, hardware, software, and procedures for creating, managing, distributing, using, storing, and revoking public keys. A traditional public key infrastructure is centralized and managed by a third-party entity, and consequently, the security of digital signatures relies on the security of said third-party entity. Hence, a distributed ledger has been proposed as a decentralized public key infrastructure that provides additional security due to decentralization. The distributed ledger is replicated and synchronized over a network using a consensus protocol without any central administrative entity. The distributed ledger that is used as a decentralized public key infrastructure provides verifiable management of public keys and is also known as a verifiable data registry. In a realization of a decentralized public key infrastructure for a digital identity system, an entity could be bound to a self-certified, self-administered identifier, known as a decentralized identifier, which is typically associated with cryptographic material that is unique to said entity. A decentralized identifier that is cryptographically bound to an electronic document signed by a digital signature can be used to establish proof of ownership by said entity.

Digital signatures have been widely used to certify the authenticity of communications on the internet and official transactions between enterprises. However, the adoption of digital signatures has so far been limited to daily-life transactions of individuals. Most documents are still largely paper-based and signed physically by handwritten signatures. This is partly due to the difficulty for individuals to generate, manage, store and use private keys and perform digital signing algorithms. Although cryptographic hardware and software components—such as a hardware security module—have been invented to facilitate the usage of cryptographic keys, there has not yet been a simple method for an individual to initiate a digital-signing algorithm as they do with signing a handwritten signature.

SUMMARY AND ADVANTAGES OF THE INVENTION

The present invention provides a method for a signer to sign and submit an electronic document by performing a single action in relation to a visual indicium associated with the document. In one embodiment, this method allows a signer, which can be a natural person, a juristic person, or a non-human entity, such as computer software and an internet-of-things device, to sign an electronic document by using a client-side device, such as a smartphone, to optically scan an indicium, such as a Quick Response code or a barcode, that is displayed on an auxiliary client system, such as a desktop computer or a tablet computer. The auxiliary client system obtains information related to the electronic document—including document metadata and information of a recipient system—from a server system and subsequently transmits said information of the electronic document—along with, if any, additional information that is input to the auxiliary client system—to the client system. Before performing said single action, the signer could be prompted by the client system to undergo an authentication process—such as password-based or biometric authentication—in order to allow the client system to access a cryptographic private key that is securely stored inside the client system's key repository, such as a cryptoprocessor or a hardware security module. Once the signer performs the single action, as indicated on the display of the client system, the client system uses the private key and the electronic document to produces a digital signature. The client system subsequently, without further input from the signer, submits the digitally signed electronic document, comprising the electronic document and the associated digital signature, to the recipient system.

DESCRIPTION OF THE DRAWINGS

An exemplary embodiment of the invention is illustrated by way of example in the following schematic drawings.

DETAILED DESCRIPTION OF THE INVENTION

Figure 1:
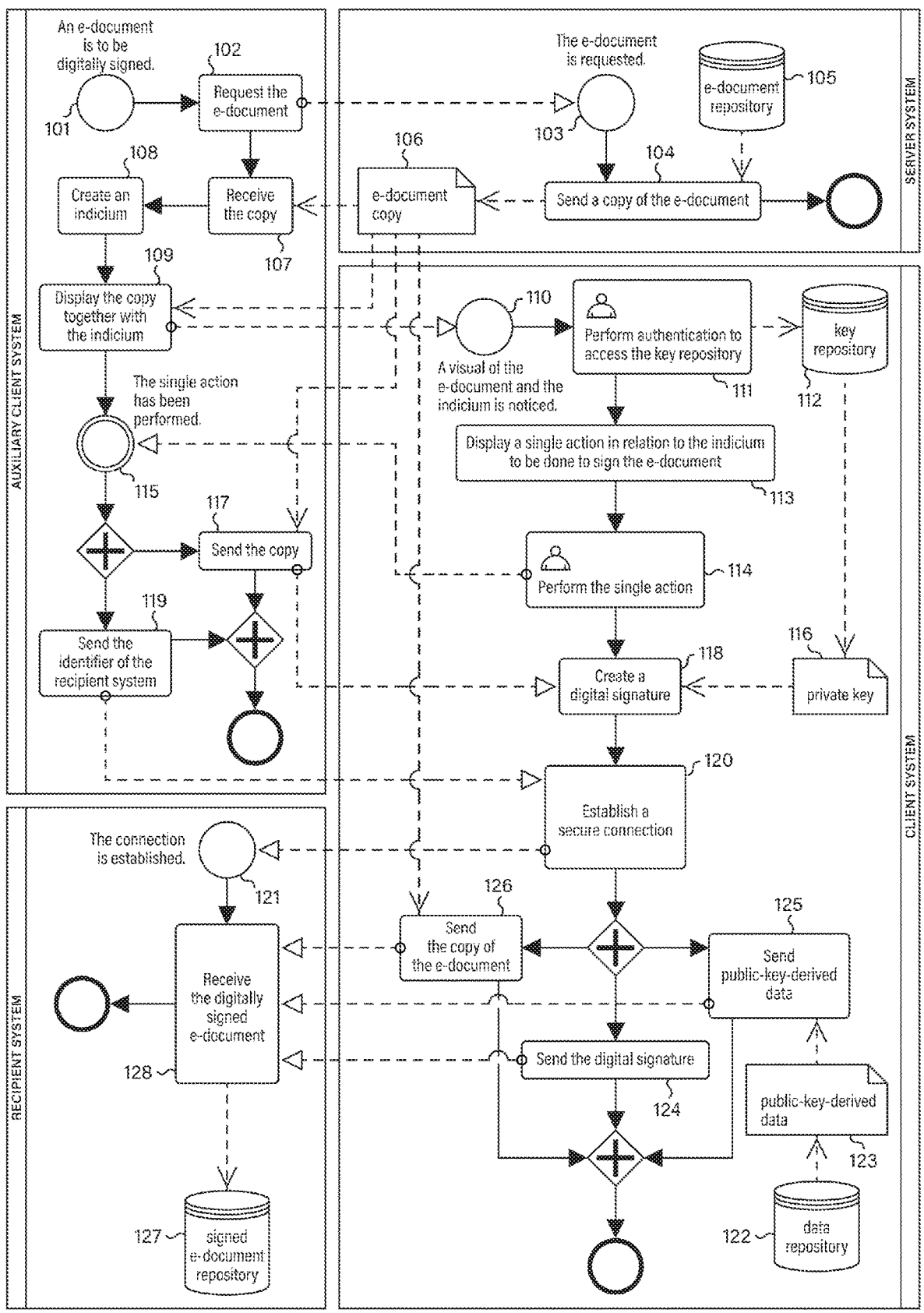
FIG. 1 is a diagrammatic representation of an exemplary embodiment of the invention, in the notation compliant to ISO/IEC 19510:2013, with four pools.

The present invention provides a method for signing and submitting an electronic document by performing a single action in relation to a visual indicium associated with the document and the network session within which the signing occurs. The single-action system of the present invention reduces the number of interactions that an entity needs to carry out in order to create and submit a digitally signed electronic document on a public-key infrastructure. The entity associated with the digital signature is regarded as the signer and can be a natural person, a juristic person, or a non-human entity, such as computer software and an internet-of-things device.

In one embodiment of the invention, there are four distinct parties: a server system, an auxiliary client system, a client system, and a recipient system. The server system stores the electronic document being considered for signing and dispatches its copy to any party upon a valid request. The auxiliary client system, having been operated to obtain the copy, creates a visual indicium encoded with actionable information, and subsequently displays the document, together with the indicium, in a manner suitable for an intended signer. The client system, whose operating entity is to sign the document, initiates the signing process that initially results in the client system displaying an indication of a single action in relation to the indicium that can be performed to sign and subsequently, without further input from the entity, submit what is regarded as the digitally signed electronic document to the recipient system within a secure internet session. The entity operating the client system is, by virtue of such operation, associated with the digital signature, and is, therefore, the signer. The recipient system receives the digitally signed electronic document from the client system and subsequently stores or processes said digitally signed electronic document.

As digital signatures rely on asymmetric cryptography, the client system comprises a subsystem configured to (i) generate and store one or more asymmetric key pairs, each of which consists of a private key and a public key; and (ii) require the entity operating the client system to authenticate before carrying out any operations to do with the key pairs belonging to the entity. One example of the subsystem is cryptographic software. Another example of the subsystem is a secure cryptoprocessor. Another example of the subsystem is a trusted execution environment. Other examples of the component configured for asymmetric cryptographic operations may be used, consistent with the spirit of the invention.

As to the method of authentication into the subsystem, one example is password-based, wherein the entity is asked to input a password pre-established with the subsystem. Another example of the method is certificate-based, wherein the entity is asked to produce a digital certificate. Another example of the method is token-based, wherein the entity is asked to produce a token previously given to the entity by the subsystem or by the client system. Another example of the method is biometric, wherein the entity is asked to produce their biometric modality whose representative data is previously stored in the subsystem or stored for the subsystem by the client system. Other examples of the authentication method may be used, consistent with the spirit of the invention.

One realization of the auxiliary client system is a desktop computer, whose displaying component is its monitor. Another realization is a tablet computer, whose displaying component is its screen. Another realization comprises a desktop computer and a printer, whereby the electronic document and indicium are printed on paper. Other realizations of the auxiliary client system may be used, consistent with the spirit of the invention.

One example of the indicium is a Quick Response code encoded with a uniform resource locator of data stored on the auxiliary client system, wherein said data is configured to contain (i) a uniform resource locator of the document copy stored on the auxiliary client system and (ii) a uniform resource locator of a service endpoint of the recipient system. The uniform resource locator encoded in the Quick Response code may be configured to be unique to the internet session the client system is going to establish with the recipient system for the purpose of submitting the document copy that has been digitally signed.

Another example of the indicium is a Code 128B barcode encoded with a JavaScript Object Notation string representing an array of (i) a uniform resource locator of the document copy stored on the auxiliary client system and (ii) a uniform resource locator of a service endpoint of the recipient system. Another example of the indicium is a Quick Response code encoded with the aforementioned JavaScript Object Notation string. Other examples of the indicium may be used, consistent with the spirit of the invention.

Given the latter example of the indicium, one realization of the client system is a smartphone wherein the initiation of the signing process is the opening of a mobile software application, and the single action is, within the environment of said application, the scanning of the indicium with the smartphone's built-in camera. The application is configured to decode the Quick Response code, parse the JavaScript Object Notation string, download the document copy, require the signer to authenticate into the smartphone's subsystem configured for asymmetric cryptographic operations, compose in conjunction with said subsystem a digital signature from the document copy and the private key, and send the package comprising the digital signature and the document copy to the recipient system through the service endpoint.

As an additional part of said package, the application may be configured to include proof that the signer is the owner of the public key. One example of the proof is a self-signed digital certificate associated with the public key. Another example is a digital certificate associated with the public key and signed by a certificate authority. Another example is a decentralized identifier associated with the public key. Other examples of the proof may be used, consistent with the spirit of the invention.

In another embodiment of the invention, the server system and the recipient system are not separate but combined into a single system. In another embodiment of the invention, the server system and the auxiliary client system are not separate but combined into a single system. In another embodiment of the invention, the auxiliary client system and the recipient system are not separate but combined into a single system. In another embodiment of the invention, the server system, the auxiliary client system, and the recipient system are not separate but combined into a single system.

Embodiments of the present disclosure will now be described with reference to the accompanying drawings. Not all embodiments of the disclosure are shown. It should not be construed that possible embodiments are limited to those set forth herein.

Figure 2:
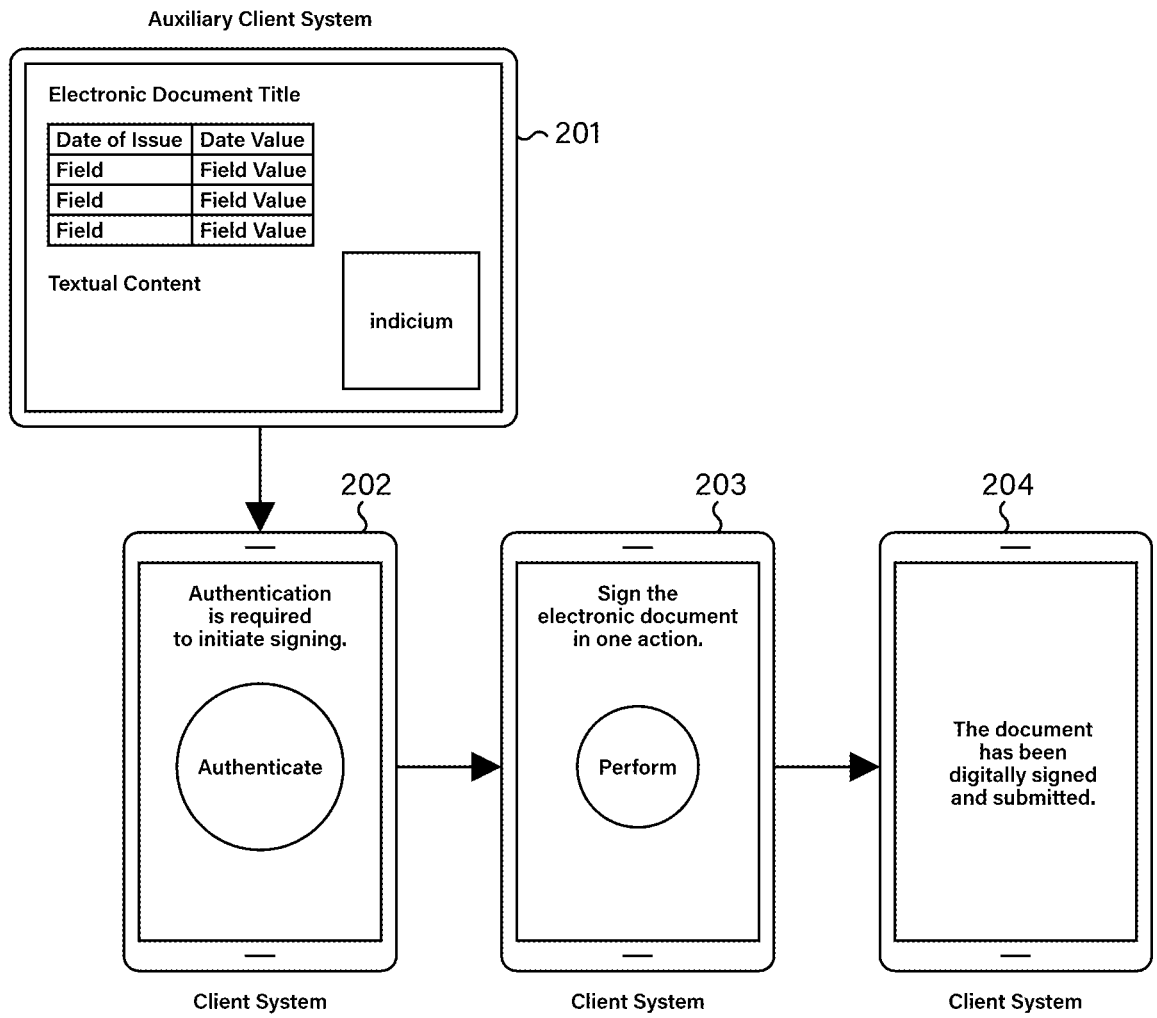
FIG. 2 is a diagrammatic representation of an exemplary embodiment of the invention, from the point of view of the entity operating the client system. First, the auxiliary client system displays a graphical representation of the electronic document to be digitally signed, along with an indicium. Second, the client system notifies the entity of a single action in relation to the indicium that is to be performed in order to sign the document. Third, the entity is asked to authenticate themselves before performing said single action. Finally, upon successful authentication, the document is signed and submitted.

FIG. 1 is a flow diagram of an embodiment of the process for signing and submitting an electronic document in the present invention. In step 101, the process is initiated by a signer on an auxiliary client system, where the signer may input information related to the electronic document. In step 102, the auxiliary client system submits a request for the electric document along with sending information that is input by the signer, if any, to a server system. After the request is received at step 103, the server system generates a copy of the electronic document at step 104 by using the schema that is stored in an electronic document repository at step 105. In step 106, the copy of the electronic document—along with, if any, document metadata, such as the timestamp at which the server system received the request; information of a recipient system, such as its service endpoint; and information from the auxiliary client system—to the auxiliary client system at step 107. Subsequently, the auxiliary client system generates a visual indicium at step 108 and displays the indicium along with the electronic document to a client system at step 109. At step 110, the client system extracts the indicium and the electronic document from the display of the auxiliary client system. At step 111, the client system prompts the signer to authenticate in order to allow the client system to access a private key inside a key repository at step 112. At step 113, the client system subsequently displays an indication of a single action in relation to the indicium that can be performed by the signer. At step 114, the signer performs said single action, which triggers the client system to notify the auxiliary client system at step 115. At steps 116, 117, and 118, the client system uses the private key from the key repository and the copy of the electronic document to create a digital signature. At step 119, the identifier, such as a service endpoint, of the recipient system from the auxiliary client system is used by the client system to establish a secure connection with the recipient system at steps 120 and 121. If the embodiment in FIG. 1 is configured to include proof of the signer's ownership of the public key, a data repository of the client system at step 122 is used to generate public-key-derived data, such as a digital certificate or a decentralized identifier that is associated with the public key, at step 123. At steps 124, 125, and 126, the client system submits the digitally signed electronic document—comprising the digital signature, the copy of the electronic document, and the public-key-derived data—to the recipient system at step 127. Finally, the recipient system stores the copy of said digitally signed electronic document in its signed electronic document repository at step 128. In an alternative embodiment, steps 113, 117, and 119 could be executed by the server system FIG. 2 illustrates the signing and submitting processes in one embodiment of the present invention. In this embodiment, an auxiliary client system displays on its screen at step 201 the content of the electronic document along with a visual indicium, encoded with actionable information for the signer. At step 202, a client system prompts a signer to authenticate in order to allow the client system to access a private key stored in the client system's key repository. At step 203, the client system obtains the electronic document along with the actionable information from the screen of the auxiliary client system and subsequently displays an indication of a single action in relation to the indicium. After the signer performs said single action, the client system displays a message notifying the signer that the electronic document has been signed and submitted to an intended recipient at step 204.

What is claimed is:

1. A computer-implemented method of signing and submitting an electronic document, the method comprising:
   under the control of a server system configured with executable instructions,
      storing the electronic document; and
      dispatching a copy of the electronic document;
   under the control of an auxiliary client system configured with executable instructions,
      obtaining the copy of the electronic document from the server system;
      creating an indicium comprising information indicative of an identifier of the electronic document and an identifier of a recipient system; and
      displaying a graphical representation of the electronic document together with said indicium;
   under the control of a client system configured with executable instructions,
      displaying an indication of a single action in relation to the indicium that is to be performed to sign the electronic document with a digital signature and subsequently submit data representative of the electronic document having been digitally signed;
      extracting information from the indicium;
      obtaining the copy of the electronic document from the server system;
      storing an asymmetric key pair, consisting of a private key and a public key;
      requiring authentication from the entity operating the client system before said private key is to be used; and
      storing a proof of said entity's ownership of said public key; and
      in response to said single action being performed,
      generating a digital signature associated with the copy of the electronic document and said private key;
      establishing a secure internet session with a recipient system;
      submitting said digital signature to the recipient system; and
      submitting the copy of the electronic document to the recipient system; and
   under the control of the recipient system configured with executable instructions,
      receiving the digital signature from the client system;
      storing said digital signature;
      receiving the copy of the electronic document from the client system; and
      storing said copy.

2. The method of claim 1 wherein the server system and the recipient system are combined.

3. The method of claim 1 wherein the server system and the auxiliary client system are combined.

4. The method of claim 1 wherein the auxiliary client system and the recipient system are combined.

5. The method of claim 1 wherein the server system, the auxiliary client system, and the recipient system are combined.

6. The method of claim 1 wherein the indicium is selected from a group consisting of a linear barcode and a matrix code.

7. The method of claim 1 wherein the information the indicium comprises is unique to the internet session the client system establishes with the recipient system.

8. The method of claim 1 wherein the entity operating the client system is selected from a group consisting of a human entity and a non-human entity.

9. The method of claim 1 wherein the single action is optically scanning the indicium with the client system.

10. The method of claim 1 wherein the client system comprises a subsystem selected from a group consisting of cryptographic software, a secure cryptoprocessor, and a trusted execution environment.

11. The method of claim 1 wherein the type of authentication is selected from a group consisting of password-based authentication, certificate-based authentication, token-based authentication, and biometric authentication.

12. The method of claim 1, further comprising:
under the control of the client system,
in response to the single action being performed,
submitting the proof to the recipient system; and
under the control of the recipient system,
receiving said proof; and
storing said proof.

13. The method of claim 12 wherein the proof is a self-signed digital certificate associated with the public key.

14. The method of claim 12 wherein the proof is a digital certificate associated with the public key and signed by a certificate authority.

15. The method of claim 12 wherein the proof is a decentralized identifier associated with the public key.

* * * * *